United States Patent
Jarrell et al.

(10) Patent No.: US 8,776,820 B2
(45) Date of Patent: Jul. 15, 2014

(54) HIGH RATE DISCHARGE (HRD) VALVE INCORPORATING A COLLET SLEEVE RELEASE MECHANISM

(75) Inventors: Joseph R. Jarrell, Sims, NC (US); Clifton Ray Jones, Kenly, NC (US)

(73) Assignee: Kidde Technologies, Inc., Wilson, NC (US)

( * ) Notice: Subject to any disclaimer, the term of this patent is extended or adjusted under 35 U.S.C. 154(b) by 216 days.

(21) Appl. No.: 13/314,895

(22) Filed: Dec. 8, 2011

(65) Prior Publication Data
US 2013/0146315 A1 Jun. 13, 2013

(51) Int. Cl.
*F16K 17/14* (2006.01)

(52) U.S. Cl.
USPC ............. 137/68.13; 251/68; 251/73; 251/74; 169/61; 169/62

(58) Field of Classification Search
USPC ......... 137/68.13, 467; 251/66, 68, 73, 74, 82, 251/83; 169/62, 61
See application file for complete search history.

(56) References Cited

U.S. PATENT DOCUMENTS

| | | | | |
|---|---|---|---|---|
| 2,665,712 A | * | 1/1954 | Pratt | 251/63.5 |
| 3,095,901 A | * | 7/1963 | Larson et al. | 137/522 |
| 3,113,172 A | * | 12/1963 | Barr | 174/11 R |
| 3,272,226 A | * | 9/1966 | Dunlop et al. | 137/478 |
| 3,410,304 A | * | 11/1968 | Paul, Jr | 137/494 |
| 3,744,816 A | * | 7/1973 | Yamaguchi et al. | 280/737 |
| 3,884,261 A | * | 5/1975 | Clynch | 137/488 |
| 3,924,688 A | * | 12/1975 | Cooper et al. | 169/61 |
| 4,159,744 A | | 7/1979 | Monte et al. | |
| 4,347,865 A | * | 9/1982 | Worley | 137/375 |
| 4,438,777 A | * | 3/1984 | Pirkle | 137/62 |
| 4,512,406 A | * | 4/1985 | Vann et al. | 166/297 |
| 4,579,315 A | | 4/1986 | Kowalski | |
| 4,691,736 A | | 9/1987 | Kowalski | |
| 4,841,788 A | * | 6/1989 | Thuries et al. | 74/2 |
| 6,148,664 A | * | 11/2000 | Baird | 73/152.38 |
| 7,878,215 B2 | | 2/2011 | McLelland et al. | |
| 2006/0016608 A1 | | 1/2006 | Simpson et al. | |
| 2012/0175543 A1 | * | 7/2012 | Simpson et al. | 251/324 |

* cited by examiner

*Primary Examiner* — John Rivell
*Assistant Examiner* — Minh Le
(74) *Attorney, Agent, or Firm* — Kinney & Lange, P.A.

(57) ABSTRACT

A valve actuation mechanism for a high rate discharge valve has a collet with fingers adjacent a valve member that provides restraint against displacement of the valve member at angularly spaced locations symmetrical about the axis of the valve member. Each collet finger has at least one projection adjacent a first end. The valve actuation mechanism also has a collet sleeve release mechanism with a main body portion having a first end and a second end. The main body portion contains an aperture with at least one land portion that secures each projection of the collet fingers. The main body portion also has an actuation pad at the second end, as well as a hinge mechanism for allowing rotational movement of the main body portion connected to the first end of the main body portion, and an actuation device that contacts the actuation pad.

13 Claims, 6 Drawing Sheets

HIGH RATE DISCHARGE (HRD) VALVE INCORPORATING A COLLET SLEEVE RELEASE MECHANISM

BACKGROUND

This invention relates to a method of and apparatus for the discharge of one or more fire extinguishing agent(s). More particularly, the invention relates to a valve opening mechanism suited to the rapid discharge of fire extinguishing agent(s) and other high mass flow applications.

The invention refers to an apparatus used to rapidly disperse extinguishing agents within a confined space such as the crew compartment of a military vehicle following a fire or explosion event. These automatic fire extinguishing systems (AFES) are deployed after the event has been detected, typically using high speed infrared (IR) and/or ultra violet (UV) sensors. The systems comprise a cylinder filled with extinguishing agent, a fast acting valve and nozzle which enables rapid and efficient deployment of agent throughout the vehicle.

The rapid discharge of a fire extinguishing agent into confined areas of vehicles subsequent to an incident (such as a fuel explosion) is known to suppress the adverse effects experienced by the personnel within the vehicle to survivable levels. Some of the criteria used to determine a survivable event include extinguishing the flame and preventing re-flashing; a reduction in temperature to prevent greater than second degree burns; and the realization of safe levels (i.e. levels up to which personnel can continue to carry out their duties) of overpressure, acid gas, oxygen and concentration of fire extinguishing agent within the vehicle.

A known apparatus for fire extinguishing in such circumstances comprises a generally cylindrical canister which contains a fire extinguishing agent which is pressurized by a gas such as nitrogen. The fire extinguishant agent must be applied rapidly. The outlet for the extinguishant from the canister is typically positioned at the base of the cylinder. A high rate discharge (HRD) valve is operated to allow the discharge of the extinguishing agent. The opening of the valve allows the nitrogen to expand, pushing the extinguishant between it and the valve out through the valve. The orientation of the canister and the location of the outlet in the cylinder allow a high proportion of the extinguishing agent to be discharged rapidly (because the extinguishing agent will be pushed out of the outlet by the nitrogen adjacent the extinguishing agent).

Existing HRD valves, following an actuation, are normally re-furbished away from the vehicle prior to re-use. In certain field conditions this causes logistical and cost issues as both the return of used suppressors and the supply of new or re-furbished hardware to the vehicle is required. In an attempt to minimize this inconvenience, a new design of the HRD valve is being disclosed that can, if required, be disposed of rather than re-furbished. The proposed modified valve may incorporate some common features to the existing valve such as outlet and pressure gauge locations but maintain system efficacy against the fire/explosion challenges.

SUMMARY

In one embodiment, a valve actuation mechanism for a high rate discharge valve has a collet with fingers adjacent a valve member that provides restraint against displacement of the valve member at angularly spaced locations symmetrical about the axis of the valve member. Each collet finger has at least one projection adjacent a first end. The valve actuation mechanism also has a collet sleeve release mechanism with a main body portion having a first end and a second end. The main body portion contains an aperture with at least one land portion that secures each projection of the collet fingers. The main body portion also has an actuation pad at the second end, as well as a hinge mechanism for allowing rotational movement of the main body portion connected to the first end of the main body portion, and an actuation device that contacts the actuation pad.

In another embodiment, a high rate discharge (HRD) valve for release of a fluid has a valve body with a central bore and a chamber cavity, an outlet port in communication with the chamber cavity, and a valve member with a stem that supports the valve member on an axis of the bore throughout displacement of the valve member from a first position to a second position. The valve also has an inlet port in communication with the bore adapted for removable attachment of a pressure-charged container of the fluid, with fluid continuously loading the valve member for displacement from the first position to the second position. In addition, the valve is provided with a collet with fingers adjacent a valve member that provides restraint against displacement of the valve member at angularly spaced locations symmetrical about the axis of the valve member. Each collet finger has at least one protrusion adjacent a first end. The valve actuation mechanism also has a collet sleeve release mechanism with a main body portion having a first end and a second end. The main body portion contains an aperture with at least one land portion that secures each protrusion of the collet fingers. The main body portion also has an actuation pad at the second end, as well as a hinge mechanism for allowing rotational movement of the main body portion connected to the first end of the main body portion, and an actuation device that contacts the actuation pad.

In yet another embodiment, a fire suppression system for release of a fire extinguishant has a pressure container for holding the fire extinguishant connected to a high speed valve as previously described. In addition, the system has a conduit connected to the flow passage of the valve, and a nozzle for dispersing the fire extinguishant upon opening of the high speed valve.

DETAILED DESCRIPTION

Efforts have been made throughout the drawings to use the same or similar reference numerals for the same or like components.

Figure 1:
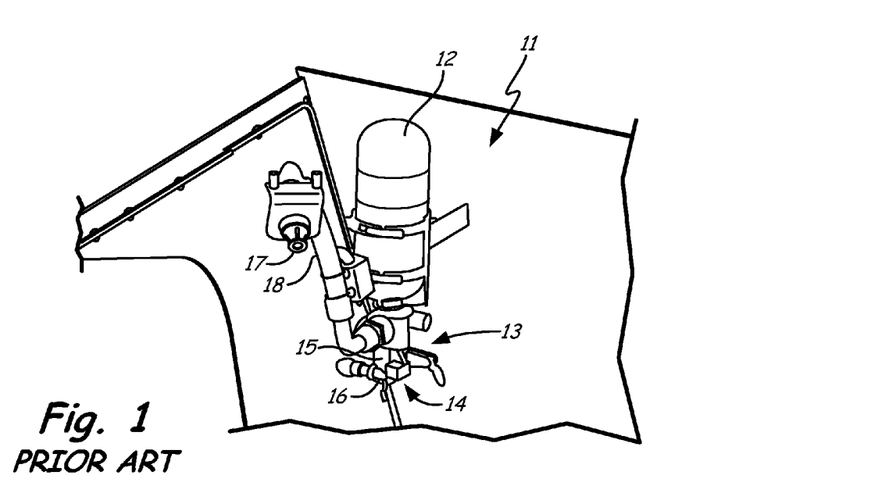
FIG. 1 is a perspective view of prior art apparatus for the discharge of a fire extinguishing agent.

A prior art apparatus 11 for the discharge of a fire extinguishing agent is shown in FIGS. 1-3B. Referring to FIG. 1, apparatus 11 comprises a generally cylindrical canister 12 and a releasing mechanism 13, such as a valve assembly 14 including high rate discharge (HRD) valve 15. The releasing mechanism 13 is opened by solenoid actuator 16. A predetermined mass of fire extinguishing agent is added to the canister 12, which is then super-pressurized with a gas such as nitrogen. Canister 12 is made from steel or a similarly high strength, rigid material to contain the pressurized extinguishing agent.

When the releasing mechanism 13 is opened the fire extinguishing agent discharges from the canister 12 in a fraction of a second. Canister 12 is usually fitted vertically (that is with its longitudinal axis extending vertically), or as close to vertical as possible, within an enclosed or confined area of a vehicle. In order for the fire extinguishing agent to be distributed homogenously within the confined area without adversely impacting the personnel or equipment contained therein, an outlet nozzle 17 needs to be extended to the highest point thereof, such as where the walls meet the roof. This is achieved in the apparatus 11 by connecting the nozzle 17 to the releasing mechanism 13 via conduit 18, such an appropriate length of hose or pipe.

The vertical orientation of the canister 12 allows releasing mechanism 13 at the outlet of canister 12 to be located at the lowest point. In one embodiment, the fire extinguishant lies at the base of canister 12 (due to its relatively high density), with the nitrogen or a similar fluid pressurizing the space above. When the releasing mechanism 13 is opened, the pressurizing fluid expands and rapidly forces the extinguishant through HRD valve 15, along conduit 18 and out nozzle 17.

When the fire extinguishing agent is super-pressurized by pressurized fluid within canister 12, a proportion of the fluid dissolves into the fire extinguishant. When HRD valve 15 is operated to deploy the fire extinguishant agent, the rapid expansion of gas dissolved within the fire extinguishing agent causes turbulence within canister 12, which forms a two phase mixture of liquid extinguishing agent and pressurizing fluid, and a foam or mousse is formed.

Figure 2:
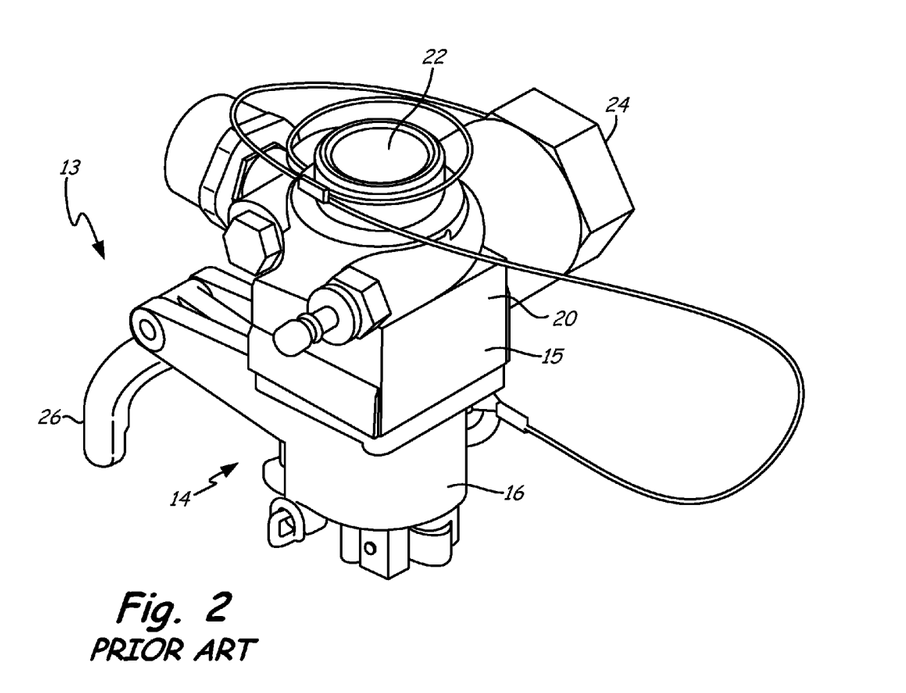
FIG. 2 is a perspective view of a prior art high rate discharge (HRD) valve.
Figure 3A:
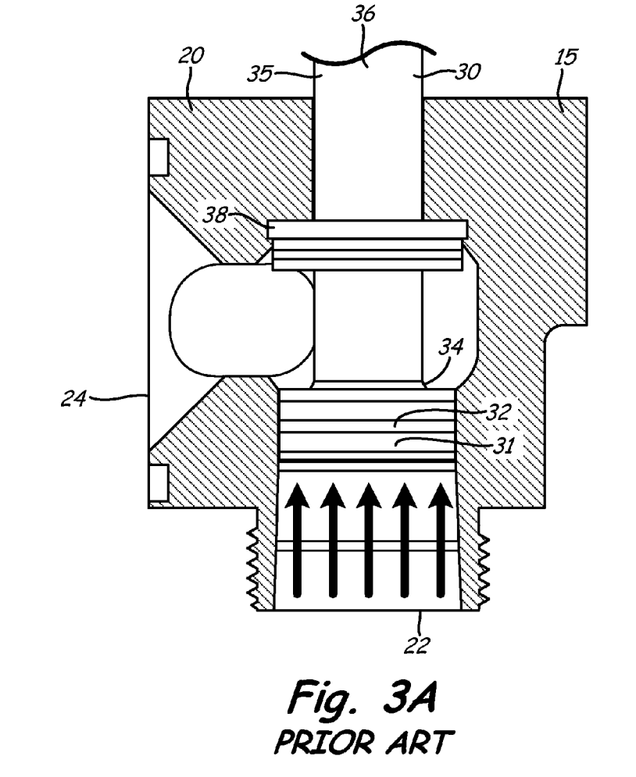
FIG. 3A is a cross-sectional view of the prior art HRD valve in the closed position.
Figure 3B:
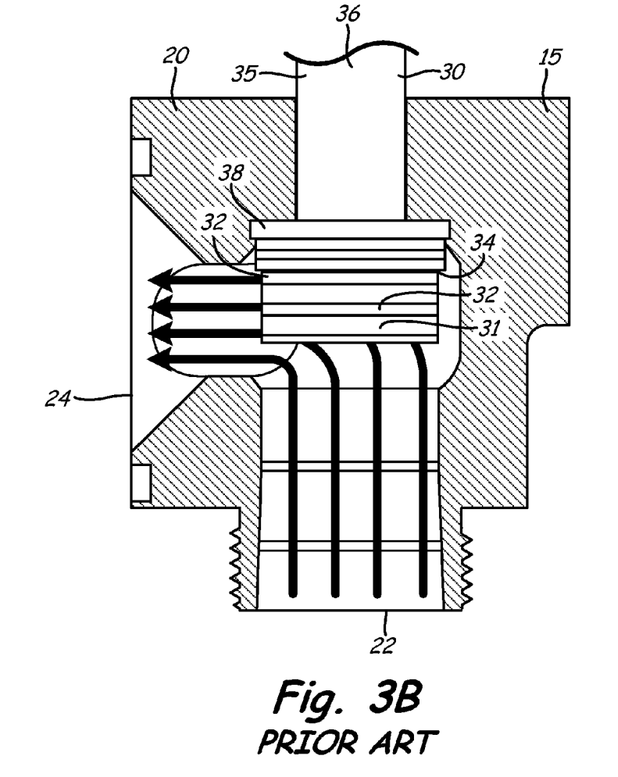
FIG. 3B is a cross-sectional view of the prior art HRD valve in the open position.

FIG. 2 is a perspective view of a prior art high rate discharge (HRD) valve 15. Valve 15 contains hollow body 20 with an elongate bore on a vertical axis that terminates with an opening that forms inlet 22. Hollow body 20 has an enlarged central cavity (as seen in FIGS. 3A and 3B) that communicates laterally with discharge outlet 24. The body of valve 15 is constructed from a metal alloy, or similarly rigid material. Valve 15 also contains mechanical override 26, as well as solenoid 16 for actuating the internal regulating mechanisms of valve 15.

FIGS. 3A and 3B illustrate the internal workings of valve 15. The main operating and regulating mechanism of valve 15 is poppet 30. Poppet 30 is used to close the entrance to an opening in the body of valve 15. Poppet 30 contains a piston 31 at proximate end 34, connected to stem 35 that terminates at distal end 36 adjacent actuating mechanisms, such as mechanical override 26 and solenoid 16. Poppet 30 is constructed from a material the same as or similar to that of body 20 of valve 15. Poppet 30 and stem 35 may be of various geometries, such as circular, oval, or polygonal in cross section so long as they match corresponding valve structures, such as the bore opening of inlet 22. In one embodiment, poppet 30 is generally cylindrical, as is stem 35 that is centrally aligned with poppet 30.

One or more annular grooves in piston 31 contain o-rings 32 which compress against the bore of valve 15, providing a seal. O-rings 32 are fabricated from rubber, or a similar elastomeric polymer capable of creating an air-tight seal between poppet 30 and body 20. Pressure inside canister 12 pushes against proximate end 34 of poppet 30, forcing poppet 30 upward while constraining seals 32 against inlet 22 and canister 12. Once poppet 30 is released, pressurized fluid contained inside canister 12 moves poppet 30 allowing the fluid to escape through outlet 24. An elastomeric bumper 38 quiets the operation and prevents damage to poppet 30 and valve body 20. Following the actuation of the valve via the release mechanism, typically a collet connected to solenoid 16 with mechanical override 26 consisting of a linkage assembly, poppet 30 slides to the open position allowing pressurized fluid, such as a fire extinguishant, to flow out of outlet 24. The use of this common valve body 20 and poppet 30 arrangement allows for high mass flow rates through the valve 15.

Figure 4A:
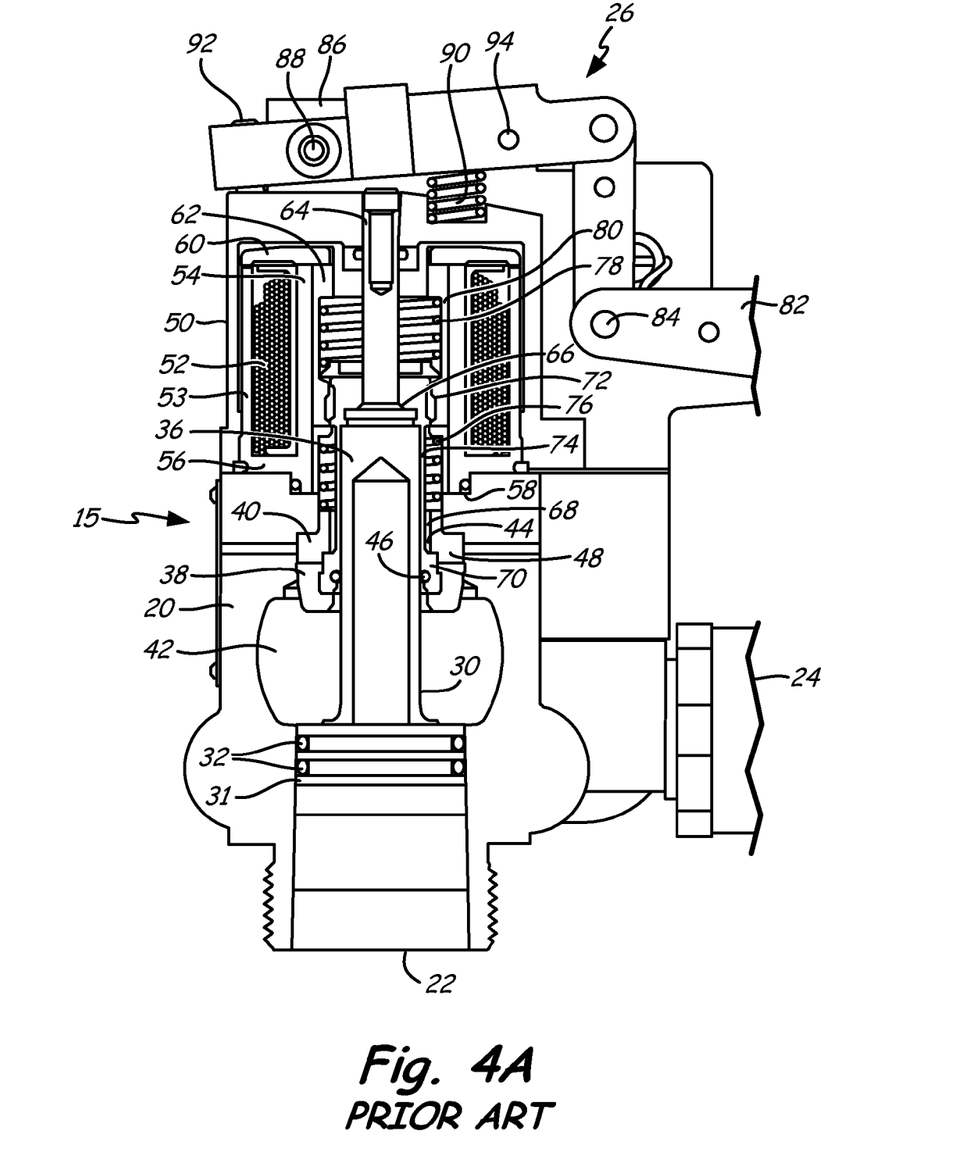
FIG. 4A is a cross-sectional view of the prior art HRD valve with a collet, poppet, and solenoid release mechanism.

Referring now to FIG. 4A, valve 15 of FIG. 1 has body 20 having elongated bore 40 on a vertical axis, upon which inlet 22 of the system upstream chamber is centered. Bore 40 is characterized by an enlarged generally central downstream chamber cavity 42 which communicates laterally with large discharge port 24. Between the upstream and downstream chambers, a smooth cylindrical land 44 receives and supports the cylindrical piston 31 of the valve member poppet 30, and separate elastomeric o-rings 32 in two spaced circumferential grooves of piston 31 establish redundant sealing of pressurized suppressant fluid from the canister 12 (see FIG. 1) when piston 31 is in its normally closed position, as shown. Bore 40 is on an axis that is counterbored to provide locating shoulders for bumper 38, which is a flange bushing of elastomeric material. The annular base ring of a collet 46 locates at a shoulder in bushing 48 and provides radial-piloting support for an elongate cylindrical surface of stem 35, shown integrally formed with piston 30.

Body 20 is effectively extended by a cupped end-housing member 50, bolted thereto and defining a cavity for containment and coaxial location of a solenoid winding 52, and a generally toroidal core associated therewith. The core is of magnetic flux-conducting material of high permeability, and the core is seen to comprise inner and outer concentric annular legs 53, 54 integrally connected by an upper radially extending annular leg 56, and concentrically fitted at to counterbore 58 in the bottom face of body 20. The toroidal flux path of the solenoid is completed via short air gaps between lower ends of legs 53, 54 and an annular armature plate 60, which derives axially slidable support from a sleeve-like armature stem 62, piloting on the cylindrical bore of the inner core leg 53. The reduced lower end of stem 35 pilots on a central bore 64 in the bottom-closure wall of end housing 50.

To retain the mechanically latched valve-closed position shown in FIG. 4A, stem 35 is locally reduced at 66 to define a radially short but circumferentially continuous shoulder, having preferably a slope α in the order of 10° to a strictly radial plane, for cam purposes; and collet 46 is characterized by an angularly distributed plurality of elongate collet fingers 68. Each collet finger 68 has an enlarged end 70 which is radially displaceable by reason of compliant flexibility along the length of each finger 68. Inner contouring of each collet end is characterized by a heel of slope α and engaged to the stem shoulder (adjacent reduction 66) when the collet end 70 is radially inwardly confined. A short sleeve 72, which is a slidable bushing on the bore of inner core leg 53, is shown positioned to provide such confinement, thereby preventing high pressure on the upstream side of poppet 30 from driving poppet 30 out of the normally closed position shown. A first coil spring 74, compressed between bushing 72 and a slidable ring 76, is retained in compressed condition by ring 76 abutment with radially outward shoulder portions of all collet ends 70, and sleeve 72 is poised for axially upward driving abutment with ring 76, relieving the same from shoulder abutment with collet ends 70, upon solenoid actuation. A second coil spring 78 is compressed between a shoulder of armature sleeve 80 and the lower finger ends of the collet, to assure against inadvertent opening of the valve in response to mechanical shock.

Figure 4B:
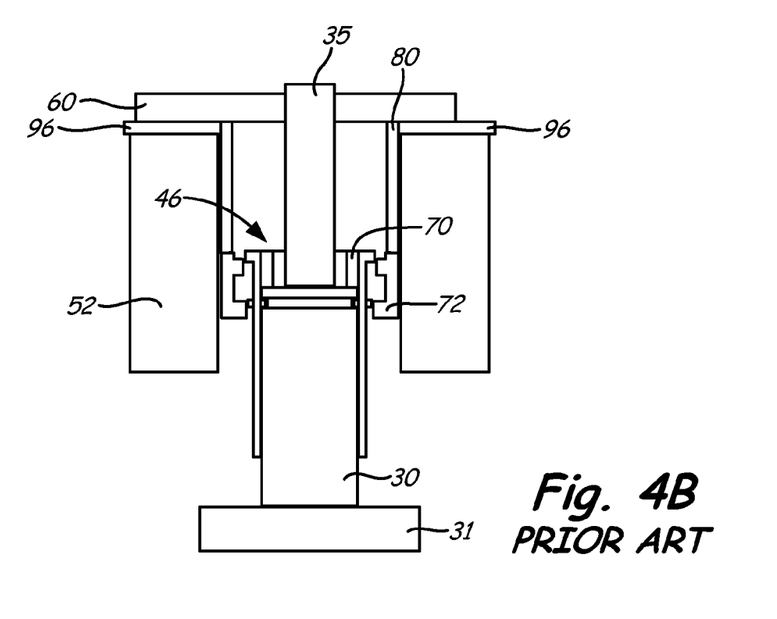
FIG. 4B is a cross-sectional schematic view of the prior art HRD valve in the closed position.
Figure 4C:
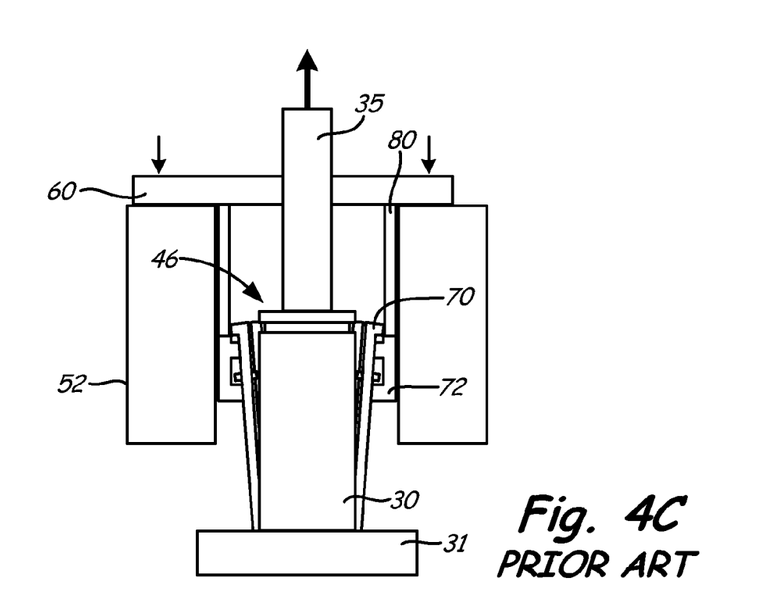
FIG. 4C is a cross-sectional schematic view of the prior art HRD valve in the open position.

FIG. 4B is a cross-sectional schematic view of the prior art HRD valve in the closed position, and FIG. 4C is the corresponding view of the prior art HRD valve in the open position. Solenoid actuation typically involves excitation of winding 52 upon development of an output signal by an explosion detector (not shown). Solenoid winding excitation causes armature plate 60 to close gaps 96 to core legs 53, 54 (see FIG. 4A), thus driving sleeve 80 to displace sleeve 72 with respect to collet ends 70. By reason of this displacement, upper and lower lands in the bore of sleeve 72 are no longer positioned to retain collet ends 70 in radially inward confinement, so that collet ends 70 may radially outwardly shift in quick response to axially upward gas-pressurized force on poppet 30 (aided by outward cam action via the engaged slopes α), thus freeing poppet 30 for gas-powered ascent and impact with bumper 38 (see FIG. 4A). The valve is immediately opened and depressant gas discharged laterally via port 24. With this prior art valve, the solenoid requires several amps to operate and as a consequence is quite bulky, heavy, and expensive.

It has been generally indicated that external mechanism 26 (see FIGS. 2 and 4A) provides a manually or otherwise actuated release of the latch action between sleeve 72 and collet ends 70. More specifically, end housing 50 is shown to integrally include side arm 82 for pinned support (at 84) of mechanism 26, as well as integral lugs or trunnion 86 for pinned support (at 88) of mechanism. A compressed spring 90 constantly urges mechanism to the position shown in FIG. 4A, the same being limited by a tail stop 92 on mechanism 26. A transverse hole 94 in mechanism 26, laterally outward of spring 90, provides access for reception of a locking pin (see FIG. 2) that prevents release of mechanism 26. The pin may be connected to a flexible cable (see FIG. 2) to avoid loss of the locking pin when it has been removed from mechanism 26.

Figure 5:
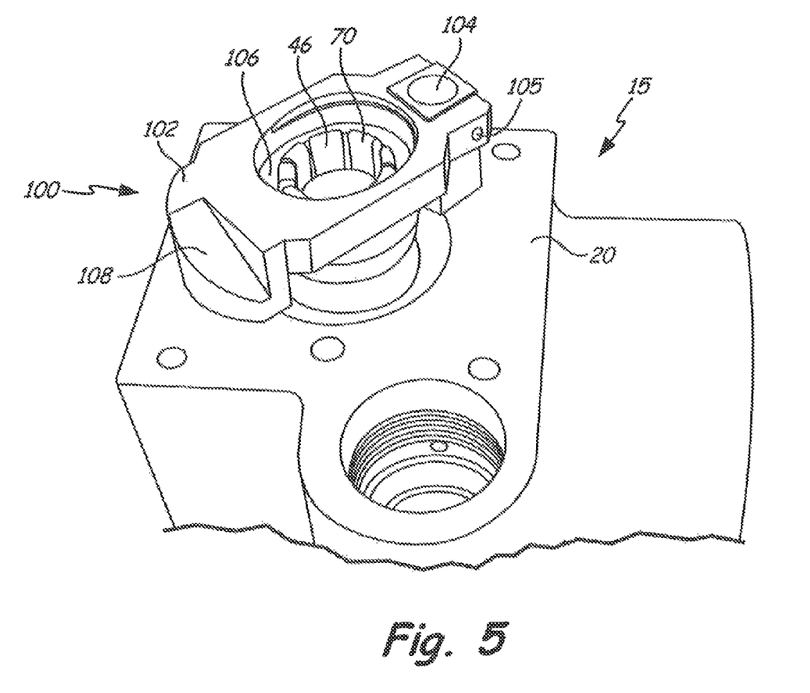
FIG. 5 is a top perspective view of a top portion of a collet sleeve release mechanism.

FIG. 5 is a top perspective view of collet sleeve release mechanism 100 that has main body portion 102 connected to pillar 104 via hinge connection 105. Collet sleeve release mechanism 100 retains collet 46 with sleeve lands 106 incorporated into main body portion 102 by contacting collet finger ends 70 as previously described. Collet 46 is used to secure stem 35 of poppet 30 when valve 15 is in the closed position. Hinged connection 105 is illustrated as a round pin that extends through pillar 104 and one end of main body portion 102 to allow for rotational movement of main body portion 102 with respect to pillar 104. Actuation pad 108 is also contained on main body portion 102. Collet sleeve release mechanism 100 is mounted to body 20 of HRD valve 15.

Figure 6:
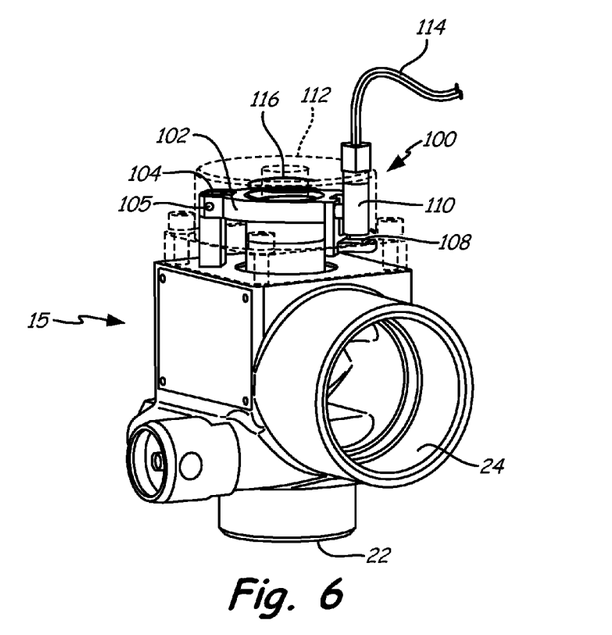
FIG. 6 is a perspective view of an HRD valve with the collet sleeve release mechanism.

FIG. 6 is a perspective view of HRD valve 15 with collet sleeve release mechanism 100. Valve 15 designs utilize the same poppet and collet design as the prior art shown in FIG. 3-4C. The collet sleeve used to allow collet 46 to maintain grip on poppet 30 has been redesigned and incorporated into collet sleeve release mechanism 100. Main body portion 102 is held in place via hinge mechanism 105 mounted onto pillar 104. A slight downwards force is maintained on collet sleeve release mechanism 100 via light spring 116 located within valve cap 112. Spring 116 prevents any unwanted movement of collet sleeve release mechanism 100 when valve 15 is exposed to high levels of vibration and shock loads.

The force required to open valve 15 is provided by protractor 110. Protractor 110 is in a vertical arrangement, and may be an electric initiator, such as a Metron™ actuator DR2000 series supplied by Chemring Group PLC. The mode of operation for such devices is to rapidly eject a pin (see FIG. 7B), typically between 6 mm and 15 mm, with a work output of between 4.9 J and 15 J. The pin contacts actuation pad 108 and forces main body portion 102 to pivot at hinge mechanism 105. In this embodiment, pad 108 is a flat extension from main body portion 102 that is on the opposite side from hinge mechanism 105. As collet sleeve release mechanism 100 pivots, sleeve lands 106 are moved out of alignment with collet ends 70, and collet 46 enters a release position that allows stem 35 of poppet 30 to be moved vertically due to pressure from the contents of attached canister 12. Spring 116 is of a diameter to allow stem 35 to pass therethrough so as not to impede opening of valve 15. Similarly, valve cap 112 is sized to allow stem 35 to move vertically into an open position. Alternatively, valve cap 112 may contain an aperture above poppet 30 that allows stem 35 to pass therethrough.

Figure 7A:
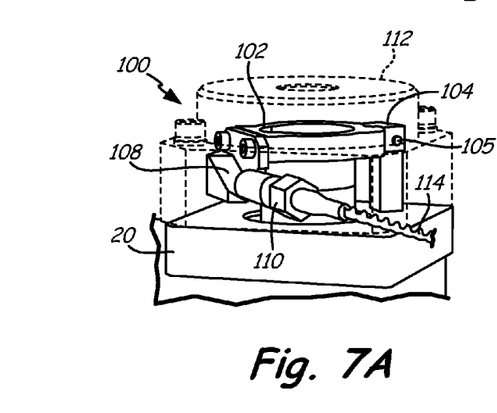
FIG. 7A is a perspective view of the collet sleeve release mechanism in the closed position.
Figure 7B:
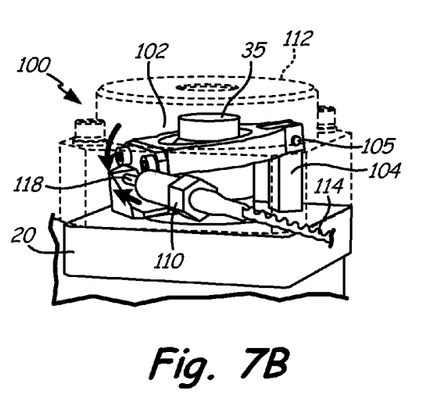
FIG. 7B is a perspective view of the collet sleeve release mechanism in the open position.

FIG. 7A is a view of collet sleeve release mechanism 102 with a horizontal protractor 110 in the closed position, and FIG. 7B is a view collet sleeve release mechanism 102 in the open position. In the embodiment illustrated, protractor 110 is mounted horizontally with respect to valve body 20, and forces pin 118 when actuated. Pin 118, as it ejects, hits pad 108, illustrated as a sloping wedge, which is incorporated within collet sleeve release mechanism 100 attached to hinge mechanism 105. As pin 118 continues to eject, pin 118 travels along the wedge of pad 118 in a horizontal direction and forces main body portion 102 of collet sleeve release mechanism 100 to travel downwards until, well before the end of movement occurs, collet 46 releases its grip on poppet 30. Valve 15 is then able to open and discharge the contents of canister 12.

Valve 15 as described in FIGS. 5-7B utilizes many of the same components used in the existing valve design of FIGS. 1-4C, which allows for making of a disposable valve. Valve 15 with collet sleeve release mechanism 100 provides a saving in both mass and space claim when compared to the prior art. In addition, the electric actuator utilized for protractor 110 requires less power to operate than solenoid 16. The lack of solenoid 16 combined with the significantly less expensive collet sleeve release mechanism 100 valve design provides the potential for a lower overall system cost. Alternatively, these valves could be retrofitted in place of the prior art design with minimal changes required to the already installed system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A high rate discharge (HRD) valve for release of a fluid, the valve comprising:
   a valve body with a vertical central bore and a chamber cavity;
   an outlet port in communication with the chamber cavity;
   a valve member, the valve member comprising:
      a stem that supports the valve member on an axis of the bore throughout displacement of the valve member from a first position to a second position;
      an inlet port in communication with the bore adapted for removable attachment of a pressure-charged container of the fluid, with fluid continuously loading the valve member for displacement from the first position to the second position;
      a collet with fingers adjacent the stem providing restraint against displacement of the valve member at angularly spaced locations symmetrical about the axis of the bore, each collet finger having at least one protrusion adjacent a first end; and
      a collet sleeve release mechanism comprising:
   a main body portion having a first end and a second end, the main body portion containing an aperture with at least one land portion that secures each protrusion of the collet fingers, and an actuation pad at the second end;
   a hinge mechanism for allowing rotational movement of the main body portion connected to the first end of the main body portion; and
   an actuation device that contacts the actuation pad, wherein the actuation device is an electric initiator which actuates horizontally with respect to the bore axis.

2. The HRD valve of claim 1, wherein the hinge mechanism comprises:
   a post attached to the valve body;
   a pin connecting the post to the second end of the main body portion of the collet sleeve release mechanism.

3. The HRD valve of claim 1, further comprising:
   a valve cap attached to the valve body, wherein the collet sleeve release mechanism is contained within the valve cap; and
   a spring between the valve cap and the main body portion of the collet sleeve release mechanism.

4. The HRD valve of claim 1, wherein the valve member is a poppet with a piston end attached to the stem.

5. A fire suppression system for release of a fire extinguishant, the system comprising:
   a pressure container for holding the fire extinguishant;
   the valve of claim 1;
   a conduit connected to the flow passage of the valve; and
   a nozzle for dispersing the fire extinguishant upon opening of the high speed valve.

6. The fire suppression system of claim 5, wherein the hinge mechanism comprises:
   a post attached to the valve body;
   a pin connecting the post to the second end of the main body portion of the collet sleeve release mechanism.

7. The fire suppression system of claim 5, further comprising:
   a valve cap attached to the valve body, wherein the collet sleeve release mechanism is contained within the valve cap; and
   a spring between the valve cap and the main body portion of the collet sleeve release mechanism.

8. The fire suppression system of claim 5, wherein the valve member is a poppet with a piston end attached to the stem.

9. A valve actuation mechanism for a high rate discharge valve, comprising:
   a collet with fingers adjacent a valve member providing restraint against displacement of the valve member at angularly spaced locations symmetrical about the axis of the valve member, each collet finger having at least one projection adjacent a first end; and
   a collet sleeve release mechanism comprising:
      a main body portion having a first end and a second end, the main body portion containing an aperture with at least one land portion that secures each projection of the collet fingers, and an actuation pad at the second end;
      a hinge mechanism for allowing rotational movement of the main body portion connected to the first end of the main body portion; and
      an actuation device that contacts the actuation pad, wherein the actuation device is a protractor mounted horizontally with respect to the main body portion.

10. The valve actuation mechanism of claim 9, wherein the mechanism is attached to a valve body having a flow passage therethrough; and wherein the valve further comprises:
    a poppet disposed within the valve body, the poppet movable between a first position in which the poppet blocks the flow passage and a second position, the poppet containing a piston connected to a stem at a proximal end of the stem, wherein the stem is secured within the valve by the collet.

11. The valve actuation mechanism of claim 10, wherein the hinge mechanism comprises:
    a post attached to the valve body;
    a pin connecting the post to the second end of the main body portion of the collet sleeve release mechanism.

12. A high rate discharge (HRD) valve for release of a fluid, the valve comprising:
    a valve body with a vertical central bore and a chamber cavity;
    an outlet port in communication with the chamber cavity;
    a valve member, the valve member comprising:
       a stem that supports the valve member on an axis of the bore throughout displacement of the valve member from a first position to a second position;
       an inlet port in communication with the bore adapted for removable attachment of a pressure-charged container of the fluid, with fluid continuously loading the valve member for displacement from the first position to the second position;
       a collet with fingers adjacent the stem providing restraint against displacement of the valve member at angularly spaced locations symmetrical about the axis of the bore, each collet finger having at least one protrusion adjacent a first end; and
       a collet sleeve release mechanism comprising:
    a main body portion having a first end and a second end, the main body portion containing an aperture with at least one land portion that secures each protrusion of the collet fingers, and an actuation pad at the second end;
    a hinge mechanism for allowing rotational movement of the main body portion connected to the first end of the main body portion; and
    an actuation device that contacts the actuation pad;
    a valve cap attached to the valve body, wherein the collet sleeve release mechanism is contained within the valve cap; and
    a spring between the valve cap and the main body portion of the collet sleeve release mechanism.

13. The HRD valve of claim 12, wherein the actuation device is actuated vertically with respect to the bore axis.

\* \* \* \* \*